US010015145B2

(12) United States Patent
Ling et al.

(10) Patent No.: US 10,015,145 B2
(45) Date of Patent: Jul. 3, 2018

(54) UNIFIED SOURCE USER CHECKING OF TCP DATA PACKETS FOR NETWORK DATA LEAKAGE PREVENTION

(71) Applicant: SonicWall US Holdings Inc., Santa Clara, CA (US)

(72) Inventors: Hui Ling, Shanghai (CN); Zhong Chen, San Jose, CA (US); Cuiping Yu, Shanghai (CN); Zunping Cheng, Shanghai (CN)

(73) Assignee: SonicWALL Inc., Santa Clara, CA (US)

( * ) Notice: Subject to any disclaimer, the term of this patent is extended or adjusted under 35 U.S.C. 154(b) by 174 days.

(21) Appl. No.: 14/819,104

(22) Filed: Aug. 5, 2015

(65) Prior Publication Data

US 2017/0041297 A1 Feb. 9, 2017

(51) Int. Cl.
*G06F 17/00* (2006.01)
*H04L 29/06* (2006.01)

(52) U.S. Cl.
CPC ........ *H04L 63/0428* (2013.01); *H04L 63/061* (2013.01); *H04L 63/20* (2013.01)

(58) Field of Classification Search
CPC ... H04L 63/0428; H04L 63/20; H04L 63/102; H04L 63/08; G06F 21/6218
USPC .......................................................... 729/1
See application file for complete search history.

(56) References Cited

U.S. PATENT DOCUMENTS

| 7,823,194 B2 * | 10/2010 | Shay ............... H04L 63/02 726/13 |
| 7,865,549 B2 * | 1/2011 | Kwon .............. H04L 1/0001 370/338 |
| 2007/0300290 A1 * | 12/2007 | Shay .............. H04L 63/0428 726/3 |
| 2011/0055571 A1 * | 3/2011 | Gluck ............. H04L 63/0869 713/171 |
| 2011/0113182 A1 | 5/2011 | Reyes |
| 2012/0148323 A1 | 6/2012 | Shimada et al. |
| 2016/0267284 A1 | 9/2016 | Willis |

OTHER PUBLICATIONS

U.S. Appl. No. 14/645,393, filed Mar. 11, 2015, Tomas Willis, Method and System for Destroying Sensitive Enterprise Data on Portable Devices.
U.S. Appl. No. 14/645,393 Office Action dated Dec. 22, 2016.

* cited by examiner

*Primary Examiner* — Ali Abyaneh
(74) *Attorney, Agent, or Firm* — Polsinelli LLP

(57) ABSTRACT

Systems and methods are directed towards network data leakage prevention (DLP). More specifically, the systems and methods are directed towards using TCP (Transmission Control Protocol) data packets in conjunction with the DLP monitor. The network DLP utilizes TCP data packets to carry source user identity. With the source user identity, the DLP monitor can determine if sensitive data can be transmitted based on the provided user information and corresponding DLP policies for each user. Furthermore, the DLP monitor can determine if sensitive data can also be transmitted for particular users in situations where multiple users share the same IP address.

20 Claims, 9 Drawing Sheets

| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 0 | 0 | Source port ||||||||||||||| Destination port |||||||||||||||||
| 4 | 32 | Sequence number:0 |||||||||||||||||||||||||||||||| 
| 8 | 64 | 0 |||||||||||||||||||||||||||||||| 
| 12 | 96 | offset: 8 |||| 0 | 0 | 0 | 0 | 0 | 0 | 0 | 0 | 0 | 0 | 1 | 0 | 0 | 0 | Window size: 0 ||||||||||||||| 
| 16 | 128 | Checksum ||||||||||||||| 0 |||||||||||||||||
| 20 | 160 | Type:79 |||||||| Length:10 |||||||| Sequence number ||||||||||||||||
| 24 | 192 | Sequence number |||||||||||||||| Length ||||||||||||||||
| 28 | 224 | Length ||||||||||||||||||||||||||||||||

FIGURE 4

| Octet | Bit | 0 1 2 3 4 5 6 7 8 9 10 11 12 13 14 15 | 16 17 18 19 20 21 22 23 24 25 26 27 28 29 30 31 |
|---|---|---|---|
| 0 | 0 | Source port | Destination port |
| 4 | 32 | Sequence number ||
| 8 | 64 | Acknowledgement number ||
| 12 | 96 | offset | Flags | Window size |
| 16 | 128 | Checksum | Urgent pointer |
| 20 | 160 | Type:80 | Length:8 | Source user identity |
| 24 | 192 | Source user identity | MAC length |
| ... | ... | ... ||
| ... | ... | MAC ||

FIGURE 6A    600

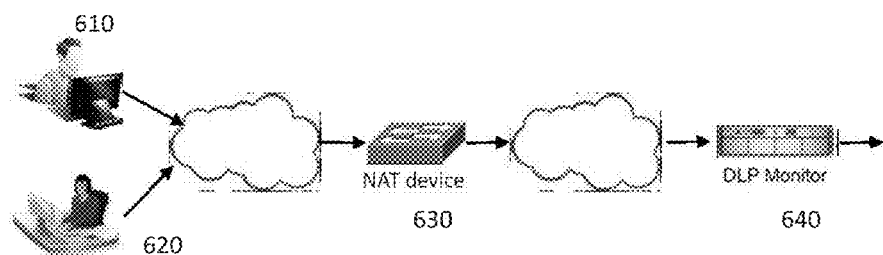

Network DLP Policies    650

*pl1*: from "John Doe", contain [credit card], action: allow
*pl2*: from "Jane Doe", contain [credit card], action: block.
*pl3*: from "John Doe", contain [Intellectual property], action: block.
*pl4*: from "Jane Doe", contain [Intellectual property], action: allow Allocated secrets for users
660

| User name | ID | Function | Authentication key |
|---|---|---|---|
| John Doe | 12384920 | f = SHA3-256 | *K1* |
| Jane Doe | 23213555 | f = SHA-512 | *K2* |

FIGURE 6B

| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 0 | 0 | Version:4 |||| IHL:5 |||| ||||||||| Total length:100 |||||||||||||||||
| 4 | 32 | Identification |||||||||||||||| Flags ||| Fragment offset |||||||||||||
| 8 | 64 | TTL |||||||| Protocol: TCP |||||||| Header checksum ||||||||||||||||
| 12 | 96 | Source IP: 192.168.1.2 ||||||||||||||||||||||||||||||||
| 16 | 128 | Destination IP: 119.177.22.21 ||||||||||||||||||||||||||||||||
| 20 | 160 | Source port: 2234 |||||||||||||||| Destination port: 6900 ||||||||||||||||
| 24 | 192 | Sequence number: 1234 ||||||||||||||||||||||||||||||||
| ... | ... | Other TCP header ... ||||||||||||||||||||||||||||||||
| 40 | 320 | Data payload containing 2341231234241235... ||||||||||||||||||||||||||||||||
| ... | ... | ...... ||||||||||||||||||||||||||||||||

FIGURE 6C

| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 0 | 0 | Version:4 |||| IHL:5 |||| colspan="24" | Total length:52 ||||||||||||||||||||||||
| 4 | 32 | colspan="16" | Identification |||||||||||||||| colspan="3" | Flags ||| colspan="13" | Fragment offset |||||||||||||
| 8 | 64 | colspan="8" | TTL |||||||| colspan="8" | Protocol: TCP |||||||| colspan="16" | Header checksum ||||||||||||||||
| 12 | 96 | colspan="32" | Source IP: 119.177.22.21 ||||||||||||||||||||||||||||||||
| 16 | 128 | colspan="32" | Destination IP: 11.16.11.2 ||||||||||||||||||||||||||||||||
| 20 | 160 | colspan="16" | Source port: 6900 |||||||||||||||| colspan="16" | Destination port: 12345 ||||||||||||||||
| 24 | 192 | colspan="32" | 0 ||||||||||||||||||||||||||||||||
| 28 | 224 | colspan="32" | 0 ||||||||||||||||||||||||||||||||
| 32 | 256 | colspan="4" | offset: 8 |||| 0 | 0 | 0 | 0 | 0 | 0 | 0 | 0 | 1 | 0 | 0 | 0 | colspan="16" | Window size: 0 ||||||||||||||||
| 36 | 288 | colspan="16" | Checksum |||||||||||||||| colspan="16" | 0 ||||||||||||||||
| 40 | 320 | colspan="8" | Type: 79 |||||||| colspan="8" | Length: 10 |||||||| colspan="16" | Sequence number: 0 ||||||||||||||||
| 44 | 352 | colspan="16" | Sequence number: 1234 |||||||||||||||| colspan="16" | Length: 0 ||||||||||||||||
| 48 | 384 | colspan="16" | Length: 60 bytes |||||||||||||||| colspan="16" | 0 ||||||||||||||||

FIGURE 6D

| Octet | Bit | 0 1 2 3 4 5 6 7 | 8 9 10 11 12 13 14 15 | 16 17 18 19 20 21 22 23 24 25 26 27 28 29 30 31 | |
|---|---|---|---|---|---|
| 0 | 0 | Version:4 | IHL:5 | | Total length:140 |
| 4 | 32 | Identification | | Flags | Fragment offset |
| 8 | 64 | TTL | Protocol: TCP | Header checksum | |
| 12 | 96 | Source IP: 192.168.1.2 | | | |
| 16 | 128 | Destination IP: 119.177.22.21 | | | |
| 20 | 160 | Source port: 2234 | | Destination port: 6900 | |
| 24 | 192 | Sequence number: 1234 | | | |
| ... | ... | Other TCP header .... | | | |
| 40 | 320 | Type: 80 | Length: 8 | Source user identity: 0xbc | |
| 44 | 352 | Source user identity: 0xfa98 | | MAC length 32bytes | |
| ... | ... | Data payload containing 234123123424l235... | | | |
| ... | ... | 256bits of MAC generated by SHA3-256 on the packet with K1 | | | |

UNIFIED SOURCE USER CHECKING OF TCP DATA PACKETS FOR NETWORK DATA LEAKAGE PREVENTION

BACKGROUND OF THE INVENTION

Field of Invention

The present invention generally relates to network data leakage prevention. More specifically, the present invention relates to unified source user checking of TCP data packets for network data leakage prevention.

Description of the Related Art

Companies and organizations have become increasingly reliant on digital information to meet business objectives. Protection of such digital information is critical for the daily operation of the companies and organizations. Leaking of the digital information can lead to significant damage to the company's reputation and value regardless of whether the data leak was caused by malicious attacks or by an inadvertent internal mistake.

To protect the digital information, especially sensitive digital information, technology referred to as data leakage prevention (DLP) or data loss protection have been developed to identify, monitor and protect data whether the data is at rest, in use or in motion. Generally, network DLPs inspect data being sent across networks to detect and prevent illegal transmission of sensitive data out of the enterprise networks. These network DLPs are generally deployed around network perimeters such as gateways as a last line of defense against data leakage.

The effectiveness of the DLP depends not only on how accurate the technology can detect sensitive data from data traffic but also how well the technology can recognize legitimate access of sensitive data. In other words, the DLP technology needs to be able to distinguish legitimate access from illegal leakage. The blocking of legitimate transmission of sensitive data, although not as bad as allowing illegal access to the sensitive information, can still disrupt normal business operations and reduce the willingness of companies to use network DLP.

Therefore, there is a need for a network DLP that is capable of differentiating actions among different users in order to let legitimate access go without being blocked or requesting for additional approval from the illegal leakages. Presently, there exist problems where network DLP associates the identity of the user with a particular IP address. The network DLP is not capable of distinguishing legitimate situations where multiple users share the same IP (e.g., share a same computer or common IP address using network address translation devices).

SUMMARY OF THE CLAIMED INVENTION

A method for data leakage prevention by checking TCP data packets is claimed. The method first establishes user information for each user with a network DLP where the user information is used to authenticate source user identity for TCP data packets. With each TCP data packet being transmitted through the network DLP, a processor intercepts the TCP data packet and evaluates whether there is sensitive information and if source user-based information is included. If there is no source user-based information, the processor requests the user to resend the TCP data packet with the source user-based information. Upon receiving the source user-based information, the processor can authenticate the identity of the user. The processor can also evaluate whether the authenticated user is authorized to transmit the sensitive information out of the enterprise network based on network DLP policies. Based on the evaluated policies, the TCP data packet transmitted by the user may be allowed or blocked.

A system for data leakage prevention by checking TCP data packets is also claimed. The system includes a server for storing user information, inclusive of secret keys, used to authenticate user identity using information provided by a user in TCP data packets. A processor is also included in the system that includes instructions stored in memory directed at establishing user information for a user associated with the network DLP where the user information includes the secret keys. The processor receives transmitted TCP data packets being sent from the user out of the enterprise network. For each TCP data packet, an evaluation is performed to determine if there is sensitive information and if there is source user-based information. If there is sensitive information but no source user-based information, the processor requests the source user-based information from the user. The user can then provide the requested source user-based information. Based on the source user-based information provided, the processor authenticates the identity of the user. The processor then evaluates if the authenticated user has the authority to transmit the sensitive information out of the enterprise network. Based on the evaluation of the policies for the user, the processor may allow or block the TCP data packet from leaving the enterprise network.

BRIEF DESCRIPTION OF THE DRAWINGS

FIG. 2 illustrates a "DLP Check Request" packet format.

FIG. 4 illustrates a source user identity option for the TCP header.

FIGS. 6A-6D illustrate example situations where the DLP monitor is applied to a situation involving two users.

DETAILED DESCRIPTION

The systems and methods described herein are directed towards network data leakage prevention (DLP). More specifically, the systems and methods are directed towards using TCP (Transmission Control Protocol) data packets in conjunction with the network DLP. Generally, the network DLP described herein utilizes the TCP data packets to carry source user identity. With the source user identity, the network DLP can determine if sensitive data can be transmitted based on the provided user information and corresponding DLP policies for each user. In this way, the network DLP can determine if sensitive data can be transmitted for any situation where TCP data packets are used. In addition, the network DLP can also determine if sensitive data can be transmitted in situations where multiple users share the same IP address.

Figure 1:
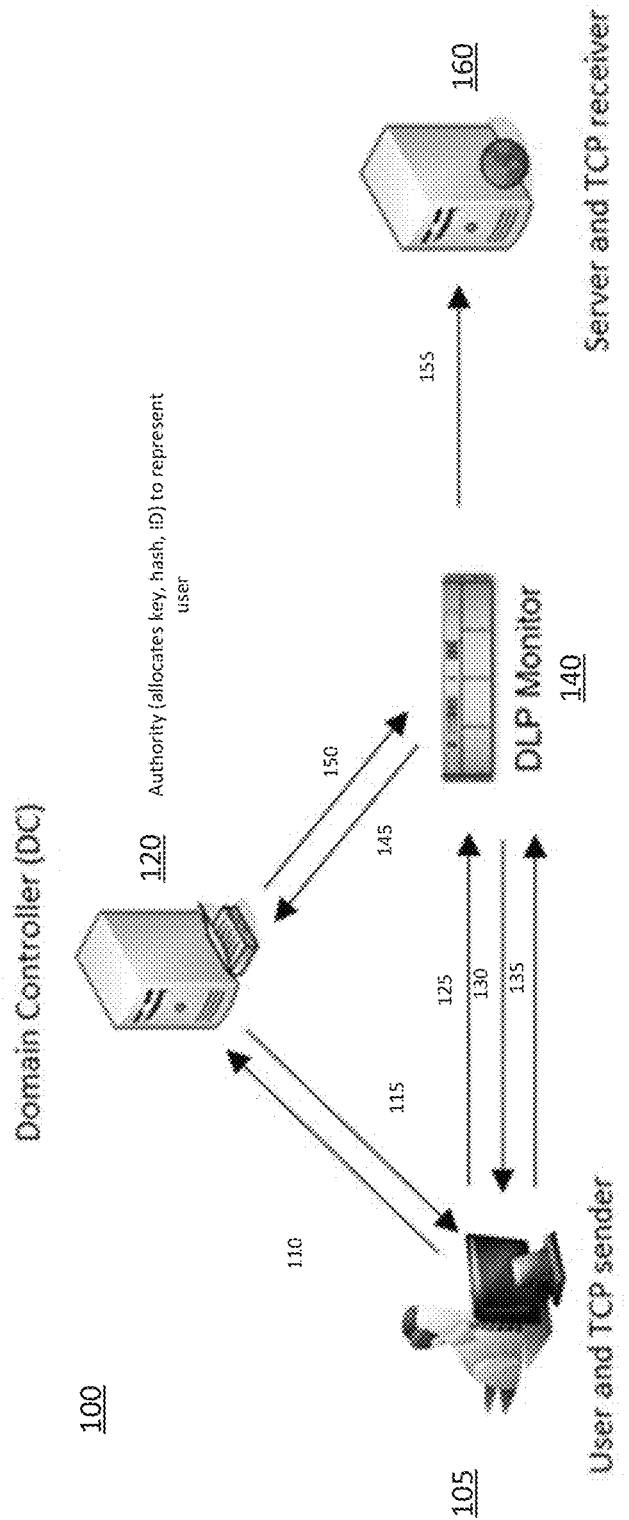
FIG. 1 illustrates a system where unified source user checking of TCP data packets for network DLP is performed.

FIG. 1 illustrates a system 100 where unified source user checking of TCP data packets for Network DLP is performed. In particular, FIG. 1 shows the interactions between the various elements of the system 100. The elements of the system 100 include a user (i.e. TCP sender) 105, domain controller 120, DLP Monitor 140 and the server (i.e. TCP receiver) 160. The method described in FIG. 1 for shared secret establishment through a domain controller is just one of many ways to achieve the distribution of shared secrets between users and the DLP Monitor 140. It should be noted that other methods may also be possible and the present application is not limited to just the described method.

The DLP monitor 140 is implemented via a processor that evaluates each of the TCP data packets being transmitted out of the network (e.g., server 160) from a user 105. As the TCP data packets are transmitted between the user 105 and the server 160, the DLP monitor 140 intercepts the TCP data packets coming from the user 105 to the server 160 to evaluate whether the transmission of the TCP data packet should be completed.

It should be noted that a connection between the user 105 and the server 160 is established for the transmission of the TCP data packet. The user 105 and/or server 160 do not establish connections with the DLP monitor 140. A benefit arising from the implementation of the DLP monitor 140 not needing an established connection with the user 105 and/or server 160 to perform the present invention allows the system 100 to be more easily scalable with many additional users 105 and/or servers 160.

To facilitate network DLP, each user 105 associated with the system 100 needs to establish some shared secrets with the system 100. The DLP monitor 140 uses secrets generated by the domain controller 120 to determine and authenticate an identity of the user 105. The DLP monitor 140 can also determine whether identified user 105 has authorization to send sensitive data outside the network, for example, to the server 160.

The domain controller 120 is responsible for monitoring log-in information of users 105 associated with the system 100. More specifically, the domain controller 120 facilitates user authentication for each user associated with the system 100 alongside the DLP monitor 140. In order to determine and authenticate identities of the various users 105 associated with the system 100, shared secrets are generated by the domain controller 120 and subsequently used by the DLP monitor 140. The secrets are generally generated when the user first logs into the DLP network (step 110). Once user identities have been authenticated, the DLP monitor 140 can determine whether the identified user 105 has authorization to transmit particular sensitive data outside the network based on corresponding DLP policies associated with the identified user 105.

With reference to the secrets that are used by the DLP monitor 140, an agent associated with the domain controller 120 generates and distributes the secrets to the users 105 as illustrated in FIG. 1 (step 115). The agent associated with the domain controller 120 also generates and distributes the secrets to the DLP monitor 140 (step 150). The DLP monitor 140 can request available secrets from the domain controller 120 (via step 145) when authenticating the user source information provided in step 135 described in further detail below.

The secrets that are generated and shared for each user 105 associated with the system 100 include a unique random ID, function $f$, and authentication key $K_a$. The secrets are generated during an initial log-in by the user 105 with the system 100. The set of shared secrets may be stored in memory (i.e. server, database) associated with the domain controller 120 for later use for that particular user 105. The set of secret keys generated by the domain controller 120 may also be updated periodically.

As noted above, the set of shared secrets include a 32-bit unique random digits (i.e., unique random ID), a standard keyed-hash message authentication code (HMAC) (i.e., function $f$) and a key used by the HMAC to generate a message authentication code (MAC) for a data packet (i.e., authentication key $K_a$). The unique random ID is inserted into the TCP data packet header and is used for source user identification. The use of the 32-bit unique random digits facilitates the preservation of user privacy for each TCP data packet transmitted. The function $f$ is a standard HMAC algorithm (e.g., MD5 or SHA) that is used to generate a MAC. The authentication key $K_a$ is a key used by the HMAC to generate MAC on a TCP data packet. The MAC is used by the DLP monitor 140 for authentication of the user identity when a user 105 tries to send sensitive data out of the enterprise network (e.g., to the server 160). Further details pertaining to the authentication of the user identification is provided below in FIG. 2.

For with reference back to FIG. 1 concerning a TCP data packet that the user 105 wishes to send the server 160, the user 105 will first establish a connection with the server 160 and send the TCP data packet that potentially contains sensitive information. The TCP data packet initially provided from the user to the server 160 will generally not contain source user identity information (step 125). The DLP monitor 140, via a processor associated with or included in the DLP monitor 140, will intercept the transmitted TCP data packet from the user 105 to determine whether sensitive data is included. If no sensitive data is found by the DLP monitor 140, the TCP data packet is allowed to be transmitted outside the enterprise network (i.e. to the server 160) (step 155). If sensitive data is found, however, the DLP monitor 140 will first check to see if source user information is included in the TCP data packet from the user 105. The DLP monitor 140 will require the user 105 to resend the TCP data packet with source user identity and message authentication code (MAC) if not already included in the TCP data packet via a DLP Check Request (step 130). If the appropriate source identity and MAC information is provided (step 135) with the resent TCP data packet from the user 105, the TCP data packet is allowed to be transmitted outside the network (e.g., to the server 160) (step 155). The DLP monitor 140 uses the MAC to authenticate the identity of the user 105 in order to prevent unauthorized users from pretending to be the user 105 thereby preventing the unauthorized users from sending sensitive information outside the network.

As described above, the DLP monitor 140 is capable of processing TCP data packets without sensitive data coming from the user 105 efficiently and with little overhead. In situations where sensitive data is detected, the DLP monitor 140 performs additional steps in order to determine whether the user 105 is authorized to transmit the sensitive data found in the TCP data packets outside the network (e.g., to the server 160). Further details describing the various steps performed by the system 100 are provided below in FIG. 5.

FIG. 2 illustrates a "DLP Check Request" packet format. In particular, the DLP Check Request is a TCP control packet that is used by the DLP monitor to request information from the user that can be used for authentication and authorization. As discussed above, the information used for authentication and authorization can be used to check whether to allow the transmission of TCP data packets that have been identified as including sensitive information from the user outside the enterprise network or not.

In embodiments of the present invention, determination as to whether a TCP data packets should be allowed or blocked based on DLP policies is based on the information provided by the user in response to the DLP Check Request. It should be noted that the original TCP data packet transmitted from the user to the server may generally not include source user information. Upon evaluating the contents of the initially transmitted TCP data packets from the user to the server, the DLP monitor can make a determination that sensitive data may be contained within the transmitted TCP data packet and that no source user information has been included. In response, the DLP monitor will generate a DLP Check Request packet on behalf of the server (i.e. the receiver of the TCP data packet). This generated DLP Check Request packet is transmitted back to the user. From the viewpoint of the user, the DLP Check Request (i.e. TCP control packet) is being provided from the server (i.e. TCP receiver) requesting retransmission of the TCP data packet with the additional information (e.g., source user information, MAC).

As discussed above, the DLP Check Request (i.e. TCP control packet) generated from the DLP monitor, instructs the user to resend the original TCP data packet along with the requested additional information (e.g., source user information and MAC). The source user information and MAC will be utilized by the DLP monitor for authentication of the identity of the user and authorization as to whether the user can transmit the TCP data packet containing the sensitive information outside of the enterprise network (e.g., to the server/TCP receiver).

The DLP Check Request is a special TCP control packet. In one embodiment, the DLP monitor can set "PSH" flag in the DLP Check Request to indicate that the DLP Check Request corresponds to a special push request for TCP data from the server (generated by the DLP monitor on behalf of the TCP receiver) directed at the user/TCP data packet sender. The DLP monitor can also include a new "DLP Resend" option in the DLP Check Request being provided to the user that requests the user to resend specific data (e.g., through the sequence no. and length fields in the option) with the requested source user information and MAC.

Figure 3:
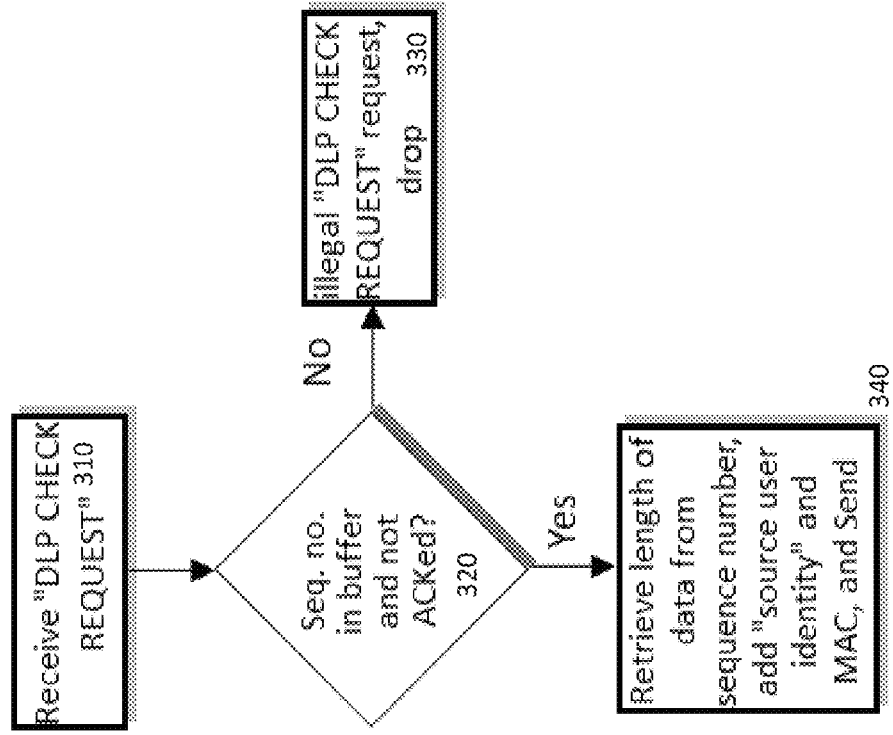
FIG. 3 illustrates a method of processing the "DLP check request" by the TCP sender (i.e. user).

FIG. 3 illustrates a method 300 of processing the "DLP check request by the TCP sender (i.e. user). Upon receipt of the DLP check request packet in step 310 by the user from the network DLP, the DLP Check Request packet is processed by the user (i.e. TCP sender). In step 320, the user evaluates to see if a sequence number in the DLP Check Request packet corresponds for a particular TCP data packet transmission that is still in a sending buffer without being acknowledged. If the TCP data packet is still in the sending buffer, the user retrieves the length of data from the sequence number and resends the TCP data packet with the "source user identity" option in the TCP header along with the MAC (step 340). If the TCP data packet is not in the sending buffer or has been acknowledged, the DLP Check Request received by the user is considered invalid (step 330). The user can then ignore/drop the invalid DLP Check Request.

FIG. 4 illustrates a source user identity option for the TCP header. More specifically, the figure illustrates a modified TCP data packet that is sent from the user to the TCP receiver in response to the DLP Check Request. The user includes the source user identity and the MAC with the resending of the data originally included in the TCP data packet. In an embodiment, the source user identity includes 4 bytes of source user ID data and 2 bytes of MAC length. The MAC is computed based on the original TCP data packet transmitted, the configured message authentication algorithm $f$ and the shared key $K_a$ between the user and the DLP monitor. The source user identity is inserted into the TCP header of the TCP data packet while the MAC is subsequently attached to the end of the TCP data packet to generate an updated (or modified) TCP data packet that is re-transmitted to the TCP receiver (i.e. server) in response to the DLP Check Request.

The modified TCP data packet (that now includes the source user identity and the MAC) is transmitted to the server (i.e. TCP receiver). The DLP monitor can then intercept and evaluate the new information in the modified TCP data packet. During the evaluation of the modified TCP data packet, the DLP monitor checks to see if it has any cached secrets for the source user. If the DLP monitor does not have the most up-to-date secrets for the source user cached, the DLP monitor can request the appropriate secrets for the source user from the domain controller agent. It should be noted that the DLP monitor may request secrets from the domain controller agents for situations where the source user is first interacting with the DLP monitor or for situations where the secrets for the source user has since been updated. As indicated above, secrets may be updated or changed for security purposes. The domain controller agent may inform the DLP monitor that updated secrets should be used rather than the secrets that are currently stored (i.e. cached). In this way, the DLP monitor may be instructed to request the domain controller for secrets for each user authentication to ensure that the most up-to-date secrets are used.

With the information from the modified TCP data packet, the DLP monitor can obtain the user name, ID, $f$, and $K_a$ associated with the user. The DLP monitor can also compute a MAC using the $f$ and the $K_a$ from the modified TCP data packet. By comparing the MAC using the shared secrets from the domain controller and the MAC from the modified TCP data packet provided by the user, the DLP monitor can determine whether the modified TCP data packet was indeed sent by the user associated with the user identification. If the MAC values are different, the DLP monitor may treat the modified TCP data packet as having no source user identity available. The TCP data packet can then be blocked from leaving the enterprise network. This situation may also correspond with an unauthorized user trying to send sensitive information outside of the network. Such transmissions are desired as being prevented from leaving the enterprise network.

If the MAC values match, however, the DLP monitor can confirm the user identity of the user sending the TCP data packet. Once the source user identity has been confirmed, the DLP monitor can then evaluate policies of the source user to the TCP data packet. Associated with each source user may be a description of what types of sensitive data the particular user may be allowed to transmit. For example, a user may be allowed to send only certain types of sensitive data. If the user is determined to be allowed to transmit the particular set of sensitive data included in the TCP data packet, the DLP monitor allows the transmission of the TCP data packet to the TCP receiver (i.e. server) outside the enterprise network. Such transmission is considered appropriate (i.e. not a leakage risk). If the user does not have authority to transmit the sensitive data, however, the DLP monitor may block the transmission of the TCP data packet. The blocking of the TCP data packet is similar to the situation as if no source user information was provided by the user. The blockage of this transmission is directed at preventing users from transmitting information that the users may not be authorized to transmit outside the enterprise network.

Figure 5:
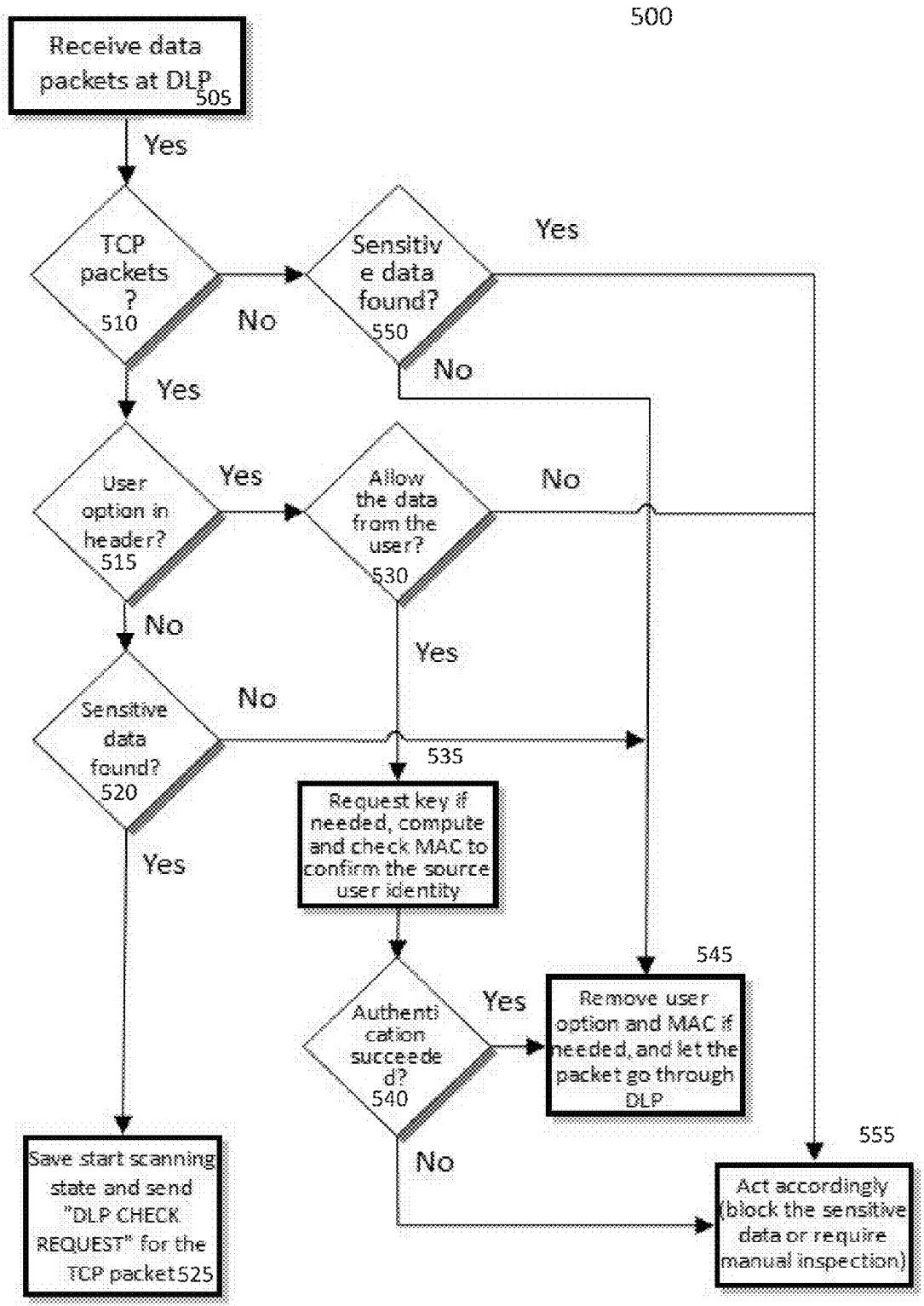
FIG. 5 illustrates a flowchart showing the processing of the TCP data packet in the network DLP.

FIG. 5 illustrates a flowchart 500 showing the processing of the TCP data packet in the network DLP. The flowchart 500 illustrates the various situations where data packets are provided by the user.

In step 505, the DLP monitor intercepts a TCP data packet that is being transmitted from the user to the TCP receiver. As noted above, a transmission connection associated with the TCP data packet is established between the user and the TCP receiver. The DLP monitor does not establish any connections with either the user or the TCP receiver. Even though the present invention is described as being applicable to TCP data packets, the DLP monitor is still capable of receiving data packets of other types as well. The DLP monitor may be capable of determining whether sensitive information is included. The DLP monitor, however, would be incapable of authentication and authorizing the transmission of the data packet as described above since the processes are applicable to TCP data packets.

In step 510, the DLP monitor evaluates whether the transmitted data packet is a TCP data packet. As noted above, the present invention is directed towards TCP data packets only. If the transmitted data packet being evaluated by the DLP monitor is not a TCP data packet, the DLP monitor can only determine if sensitive data is found in the received data packet (see step 550). Based on whether the data packet has sensitive data and whether such sensitive data can be transmitted outside of the network, the DLP monitor can allow (see step 545) or block transmission of the received non-TCP data packet (see step 555) based on existing policies enforced by the DLP monitor.

If the transmitted data packet, however, is a TCP data packet, the DLP monitor evaluates the TCP data packet to determine if there is source user information (see step 515) and whether there is any sensitive information contained in the TCP data packet (see step 520). If there is sensitive information but there is no source user information, the DLP monitor will generate a DLP Check Request on behalf of the TCP receiver to obtain the requested source user information as described above in FIGS. 3 and 4 (see step 525). The DLP monitor will begin processing the TCP data packet but will only continue the processing of the TCP data packet once the DLP monitor evaluates the modified TCP data packet that includes the user identity and MAC obtained in response to the DLP Check Request discussed above.

If the TCP data packet (i.e. modified TCP data packet) evaluated by the DLP monitor, has user identity information and MAC, the DLP monitor can authenticate the identity of the user. Afterwards, presuming that the identity check is satisfactory, the DLP monitor will determine if sensitive data for this particular user should be allowed to be transmitted based on DLP policies associated with the user (see step 530). The identity of the user is first confirmed through the use of the MAC information provided in the modified TCP data packet and the shared secret provided by the domain controller agent as described above in FIG. 4. Once the identity is confirmed, the associated DLP policy is checked. If the specific user is authorized to transmit the sensitive data, the DLP monitor will allow transmission of the TCP data packet outside of the network (e.g., to the TCP receiver/server) (see step 545). Please note that the "source user identity" option and MAC, if exist in the TCP data packet, are removed from the TCP data packet before the packet is forwarded outside the enterprise network. If the specific user is not authorized to transmit the sensitive data, however, the DLP monitor will drop the TCP data packet and prevent the user from transmitted the TCP data packet out of the network (see step 555).

FIG. 6 illustrates example situations where the DLP monitor is applied to a situation involving two users. More specifically, FIG. 6A illustrates a situation 600 describing how the DLP monitor 640 operates where two users ("John Doe" 610 and "Jane Doe" 620) are attempting to transmit sensitive information outside the enterprise network. Furthermore, FIGS. 6B-6D illustrates example TCP packets associated with one of the users for source identification.

As illustrated in the figure, both "John Doe" 610 and "Jane Doe" 620 are attempting to send information (via TCP data packets) outside the enterprise network where the DLP monitor 640 is present. It should be noted that the information being provided by both users 610, 620 will initially look like they are being provided from the same source at least from the DLP monitor standpoint. The same source identification (i.e. source IP address) is caused by the NAT (network address translation) device 630 which is between the users 610, 620 and the DLP monitor 640. Without additional information, the DLP monitor 640 is unable to distinguish which TCP data packet is being provided from which user 610,620.

Exemplary policies 650 are included in FIG. 6. For example, the DLP monitor 640 may allow credit card-based information or intellectual property-based to be transmitted outside the network from particular user(s). In this case, John Doe 610 is authorized to transmit credit card-based information while Jane Doe 620 is allowed to transmit intellectual property-based information.

When John Doe 610 and Jane Doe 620 initially log into their domain computers (e.g., work-related computers authorized for work), each of the users 610, 620 may be allocated with secrets used during DLP authentication 660. These secrets will be used by the DLP Monitor for source user identification as described above. The secrets that are generated during log-in for each user includes a unique identification (ID) number, a function and authentication key. As described above, the ID is a 32-bit unique random digit used to identify each user. The function is a standard keyed-hash message authentication code (HMAC) algorithm for generating the message authentication code (MAC). The key is used by the function to generate the message authentication message.

When John Doe 610 attempts to send a credit card number outside the network to an external party using, for example, instant messaging (e.g., MSN messenger), the corresponding TCP data packet including the credit card number may be similar to the TCP data packet illustrated in FIG. 6B. Because the TCP data packet goes through the NAT device, the source address and source port for John Doe is translated into a shared IPv4 address and port (see FIG. 6C).

When evaluating the transmitted TCP data packet from the user to the TCP receiver, the DLP monitor 640 can identify that sensitive information (e.g., credit card information) is currently included in the TCP data packet. The DLP monitor 640 also identifies that there is currently no "source user identity" option in the TCP data packet.

Before a determination is made to allow or block the TCP data packet being transmitted out of the network, the DLP monitor 640 will generate a "DLP Check Request" on behalf of the TCP receiver (see FIG. 6C). The DLP Check Request control packet is sent back to the original sender. The DLP Check Request control packet will ask the user to retransmit the TCP data packet with additional requested information (e.g., user information and MAC).

As noted above, the user (e.g., John Doe 610) appears to receive a DLP Check Request from the TCP receiver requesting for retransmission of the original TCP data packet with the additional requested information. John Doe 610 then checks to see if the TCP connection between him and the TCP receiver has data corresponding to the sequence number that was previously sent but has not yet been acknowledged. If possible, John Doe 610 retrieves the requested data and resends the updated/new TCP data packet to the TCP receiver. The updated TCP data packet includes the original data provided in the first TCP data packet, the requested "source user identity" and MAC. An exemplary new TCP data packet is illustrated in FIG. 6D.

The new TCP data packet is evaluated by the DLP monitor 640 as it is being transmitted to the TCP receiver. The DLP monitor 640 extracts the source user identity from the updated TCP data packet. Since this may be the first time the DLP monitor 640 is seeing the user ID associated with the source user identity sent by John Doe 610, the DLP monitor 640 will send a request to the DC agent to authenticate the user ID. The DLP monitor 640 retrieves the secrets associated with the user ID.

By using the secrets, the DLP monitor 640 confirms that the sender is actually John Doe 610 by evaluating the user ID associated with the source user identity provided in the new TCP data packet. The confirmation is performed by using the MAC from the new TCP data packet and the MAC calculated from the secrets provided by the DC agent.

Once John Doe 610 has been identified as the sender of the TCP data packet, the DLP monitor 640 removes the source user identity and MAC information that was added to the new TCP data packet. The DLP monitor 640 will then evaluate the policies 650 to determine what types of sensitive information John Doe 610 is authorized to send. Based on the policies 650, the DLP monitor 640 can allow the sensitive information out of the network or block the sensitive information from leaving the network. With reference to FIG. 6A, the policies 650 for the DLP monitor 640 allows John Doe 610 to transmit credit card-based information outside of the network.

It should be noted that the process of requesting source user identity and MAC information is performed for each TCP data packet containing sensitive information. Regardless whether the user was previously identified by the DLP monitor 640, the DLP monitor 640 is directed to evaluate the identity of the user who is sending a current TCP data packet containing sensitive information outside the network to ensure that no one else is pretending to be another user.

In situations where the DLP monitor 640 fails to match the source user identity and MAC in the new TCP data packet with the information provided by the DC agent (e.g., secrets), the DLP monitor 640 may treat the new TCP data packet as a TCP data packet with no source user information available. If this is the case, the TCP data packet with sensitive information may be generally blocked to prevent data leakage since the identity of the user and whether the user is authorized to transmit the particular sensitive information is unknown.

Additionally, if after successfully identifying with the DLP monitor 640, John Doe 610 attempts to transmit other types of information (e.g., intellectual property-based information) that he does not have authority to transmit outside the network as indicated by the policies 650, the DLP monitor 640 will block the TCP data packets having the unauthorized sensitive information from leaving the network. At least in this situation, the DLP monitor 640 does not need to perform a validation of the source user identity for John Doe 610 again using MAC information (i.e. request a new TCP data packet with source user information and corresponding MAC). As far as data leakage is concerned, situations where other users pretending to be John Doe 610 to transmit sensitive data to be blocked does not pose any serious security risk of data leaking. A block of the unauthorized data packet without confirming that the TCP data packet was indeed provided by John Doe 610 can be performed.

At least through the present invention, other users may pretend to be John Doe 610 by sniffing TCP data packets being sent by John Doe 610 in the network to obtain information (e.g., source user information) that can be provided to the DLP monitor 640. The other users, however, would be unable to generate a MAC that matches the MAC computed by the DLP monitor 640. The other users would not have access to the secrets shared between John Doe 610 and the DC agent since the shared secrets are not transmitted in the network by John Doe 610. The end result is that other users pretending to be John Doe 610 to send sensitive information outside the network will be blocked based on the DLP monitor 640 failing to match the MAC provided by the other users and the MAC generated by the secrets.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for data leakage prevention (DLP) by checking transfer control protocol (TCP) data packets, the method comprising:
    establishing user information for a user with a network, the user information including secret keys for authenticating source user identity for TCP data packets being sent by a user device of the user;
    intercepting a transmitted TCP data packet from the user device containing sensitive information, wherein the transmitted TCP data packet is being transmitted out of the network;
    identifying, via a processor, that the transmitted TCP data packet from the user device does not contain source user-based information that is required to authenticate the user;
    sending a request over a network interface to the user device that identifies source user-based information associated with the user, wherein the user device places the identified source user-based information in one or more data fields of a retransmitted TCP data packet based on a shared secret associated with the secret keys when an acknowledgment to the transmitted TCP data packet has not been received by the user device;
    receiving the retransmitted TCP data packet from the user device, the retransmitted TCP data packet containing the source user-based information placed in the one or more data fields by the user device;
    evaluating, via the processor, that the source user-based information included in the one or more data fields of the retransmitted TCP data packet matches the user information established with the network, thereby authenticating the identity of the user based on the shared secret;

evaluating, via the processor, corresponding policies associated with the authenticated user; and processing, via the processor, the retransmitted TCP data packet containing sensitive information based on the evaluated policies for the authenticated user.

2. The method of claim 1, wherein the user information for the user is established during an initial log-in with the network.

3. The method of claim 1, wherein the user information includes a unique random identification, a standard keyed-hash message authentication code and a key used by the authentication code to generate a message authentication code.

4. The method of claim 1, wherein the policies dictate what types of sensitive information can be transmitted by the user outside the network.

5. The method of claim 1, wherein processing the retransmitted TCP data packet based on the evaluated policies includes blocking further transmission of the TCP data packet outside of the network.

6. The method of claim 1, wherein processing the retransmitted TCP data packet based on the evaluated policies includes allowing the transmission of the TCP data packet outside of the network.

7. The method of claim 1, wherein the source user-based information included in the retransmitted TCP data packet includes a message authentication code.

8. The method of claim 7, wherein evaluating the source user-based information comprises matching the message authentication code included in the retransmitted TCP data packet by the user and the message authentication code generated via the secret keys.

9. A system for data leakage prevention (DLP) by checking transfer control protocol (TCP) data packets, the system comprising:
- a memory that stores secret keys for authenticating source user identity for TCP data packets sent by each user device;
- a processor associated with the memory, wherein the processor executes instructions stored in the memory to establish user information for a user associated with a network, the user information including secret keys for authenticating source user identity for TCP data packets being sent by a user device of the user; and
- a network interface that intercepts a transmitted TCP data packet from the user device containing sensitive information, wherein the transmitted TCP data packet is transmitted out of the network,
- wherein the processor executing instructions out of the memory identifies that the intercepted TCP data packet from the user does not contain source user-based information that is required to authenticate the user,
- wherein the network interface:
  sends a request to the user device that identifies source user-based information associated with the user wherein the user device places the identified source user-based information in one or more data fields of a retransmitted TCP data packet based on a shared secret associated with the secret keys of the user when an acknowledgment to the transmitted TCP data packet has not been received by the user device, and
  receives the retransmitted TCP data packet,
- wherein the processor identifies that the source user-based information included in the one or more data fields of the retransmitted TCP data packet matches the user information established with the network, thereby authenticating the identity of the user based on the shared secret, and processes the retransmitted TCP data packet containing sensitive information based on policies associated with the authenticated user.

10. The system of claim 9, wherein the user information for the user is established during an initial log-in with the network.

11. The system of claim 10, wherein the user information includes a unique random identification, a standard keyed-hash message authentication code and a key used by the authentication code to generate a message authentication code.

12. The system of claim 9, wherein the policies dictate what types of sensitive information can be transmitted by the user outside the network.

13. The system of claim 9, wherein processing the retransmitted TCP data packet based on the evaluated policies includes blocking further transmission of the TCP data packet outside of the enterprise network.

14. The system of claim 9, wherein processing the retransmitted TCP data packet based on the evaluated policies includes allowing the transmission of the TCP data packet outside of the enterprise network.

15. The system of claim 9, wherein the source user-based information included in the retransmitted TCP data packet includes a message authentication code.

16. The system of claim 15, wherein evaluating the source user-based information comprises matching the message authentication code included in the retransmitted TCP data packet by the user and the message authentication code generated via the secret keys.

17. A non-transitory computer readable storage medium, having embodied thereon a program executable by a processor to perform a method for data leakage prevention (DLP) by checking transfer control protocol (TCP) data packets, the method comprising:
- establishing user information for a user with a network, the user information including secret keys for authenticating source user identity for TCP data packets being sent by a user device;
- intercepting a transmitted TCP data packet from the user device containing sensitive information, wherein the transmitted TCP data packet is being transmitted out of the network;
- identifying that the transmitted TCP data packet from the user device does not contain source user-based information that is required to authenticate the user;
- sending a request to the user device that identifies source user-based information that is associated with the user, wherein the user device places the identified source user-based information in one or more data fields of a retransmitted TCP data packet based on a shared secret when an acknowledgment to the transmitted TCP data packet has not been received by the user device;
- receiving the retransmitted TCP data packet from the user device, the retransmitted TCP data packet containing the source user-based information placed in the one or more data fields by the user device;
- evaluating that the source user-based information included in the one or more data fields of the retransmitted TCP data packet matches the user information established with the network, thereby authenticating the identity of the user based on the shared secret;
- evaluating corresponding policies associated with the authenticated user; and processing the retransmitted TCP data packet containing sensitive information based on the evaluated policies for the authenticated user.

18. The non-transitory computer readable storage medium of claim 17, wherein the user information for the user is established during an initial log-in with the network.

19. The non-transitory computer readable storage medium of claim 17, wherein the user information includes a unique random identification, a standard keyed-hash message authentication code and a key used by the authentication code to generate a message authentication code.

20. The non-transitory computer readable storage medium of claim 17, wherein the policies dictate what types of sensitive information can be transmitted by the user outside the network.

\* \* \* \* \*